United States Patent
Stewart et al.

(10) Patent No.: US 10,510,350 B2
(45) Date of Patent: Dec. 17, 2019

(54) INCREASING ACTIVATION CUE UNIQUENESS

(71) Applicant: Lenovo (Singapore) Pte. Ltd., Singapore (SG)

(72) Inventors: Aaron Michael Stewart, Raleigh, NC (US); Rod D. Waltermann, Rougemont, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/085,701

(22) Filed: Mar. 30, 2016

(65) Prior Publication Data

US 2017/0287492 A1    Oct. 5, 2017

(51) Int. Cl.
| | |
|---|---|
| *G10L 15/00* | (2013.01) |
| *G10L 17/24* | (2013.01) |
| *G10L 15/065* | (2013.01) |
| *G10L 15/22* | (2006.01) |
| *G10L 15/07* | (2013.01) |
| *G10L 15/06* | (2013.01) |
| *G10L 15/08* | (2006.01) |

(52) U.S. Cl.
CPC .......... *G10L 17/24* (2013.01); *G10L 15/065* (2013.01); *G10L 15/22* (2013.01); *G10L 15/063* (2013.01); *G10L 15/07* (2013.01); *G10L 2015/088* (2013.01); *G10L 2015/223* (2013.01); *G10L 2015/225* (2013.01)

(58) Field of Classification Search
CPC ......... G10L 15/00; G10L 15/02; G10L 15/06; G10L 15/063; G10L 15/065; G10L 15/07; G10L 15/22; G10L 15/222; G10L 2015/022; G10L 2015/025; G10L 2015/027; G10L 2015/0631; G10L 2015/0633; G10L 2015/0635; G10L 2015/0636; G10L 2015/223

See application file for complete search history.

(56) References Cited

U.S. PATENT DOCUMENTS

| | | | | |
|---|---|---|---|---|
| 9,117,449 | B2 * | 8/2015 | Newman | G10L 15/22 |
| 9,263,042 | B1 * | 2/2016 | Sharifi | G10L 15/22 |
| 9,275,637 | B1 * | 3/2016 | Salvador | G10L 15/01 |
| 9,373,321 | B2 * | 6/2016 | Bapat | G10L 15/06 |
| 9,384,759 | B2 * | 7/2016 | Zakarauskas | G10L 25/78 |
| 9,548,047 | B2 * | 1/2017 | Clark | G10L 15/063 |
| 10,002,613 | B2 * | 6/2018 | Rubin | G10L 25/51 |
| 10,157,272 | B2 * | 12/2018 | Kim | G06F 21/32 |
| 2013/0289994 | A1 * | 10/2013 | Newman | G10L 15/22 704/254 |

(Continued)

*Primary Examiner* — Richard Z Zhu

(74) *Attorney, Agent, or Firm* — Ference & Associates LLC

(57) ABSTRACT

One embodiment provides a method, including receiving, at an audio capture device, a customized activation cue; identifying, using a processor, contextual information associated with a user; analyzing, using the contextual information, characteristics of the customized activation cue; identifying, based on the analyzation, a uniqueness associated with the customized activation cue; and responsive to said identifying, notifying a user that the customized activation cue has inadequate uniqueness. Other aspects are described and claimed.

20 Claims, 3 Drawing Sheets

(56) References Cited

U.S. PATENT DOCUMENTS

| | | | |
|---|---|---|---|
| 2014/0012586 A1* | 1/2014 | Rubin | G10L 25/51 704/273 |
| 2015/0154953 A1* | 6/2015 | Bapat | G10L 15/06 704/251 |
| 2016/0293168 A1* | 10/2016 | Chen | G10L 15/22 |
| 2017/0053650 A1* | 2/2017 | Ogawa | G10L 15/22 |

* cited by examiner

INCREASING ACTIVATION CUE UNIQUENESS

BACKGROUND

Electronic devices such as laptops, tablets, smart phones, personal assistants, etc., accept user inputs (e.g., at audio input devices). Users provide inputs to control the device as well as to enter data (e.g., requesting information, accessing information, or provide information into an application, such as a communication application), for example inputs to communicate using, email, SMS text messaging, instant messaging, etc.

One of the fastest growing methods of user input is voice command. Voice command technology enables operation of a device through user voice instructions. The number and type of devices capable of voice control is steadily increasing. This is especially true regarding cellular phones and stand-alone personal digital assistants. Users may use voice command enabled devices without the need to operate a device through buttons or switches, thus allowing a user to perform other tasks with increased safety and efficiency. However, the use of these devices can still feel unnatural or awkward. Specifically when a user is required to repeatedly activate the device using an uncomfortable or difficult to say phrase.

BRIEF SUMMARY

In summary, one aspect provides a method, comprising: receiving, at an audio capture device, a customized activation cue; identifying, using a processor, contextual information associated with a user; analyzing, using the contextual information, characteristics of the customized activation cue; identifying, based on the analyzation, a uniqueness associated with the customized activation cue; and responsive to said identifying, notifying a user that the customized activation cue has inadequate uniqueness.

Another aspect provides an information handling device, comprising: an audio capture device; a processor; a memory device that stores instructions executable by the processor to: receive, at the audio capture device, a customized activation cue; identify, using the processor, contextual information associated with a user; analyze, using the contextual information, phonetic characteristics of the customized activation cue; identify, based on the analyzation, a uniqueness associated with the customized activation cue; and responsive to said identification, notify a user that the customized activation cue has inadequate uniqueness.

A further aspect provides a product, comprising: a storage device having code stored therewith, the code being executable by a processor and comprising: code that receives, at an audio capture device, a customized activation cue; cope that identifies, using the processor, contextual information associated with a user; code that analyzes, using the contextual information, phonetic characteristics of the customized activation cue; code that identifies, based on the analyzation, a uniqueness associated with the customized activation cue; and code that responsive to said identification, notifies a user that the customized activation cue has inadequate uniqueness The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
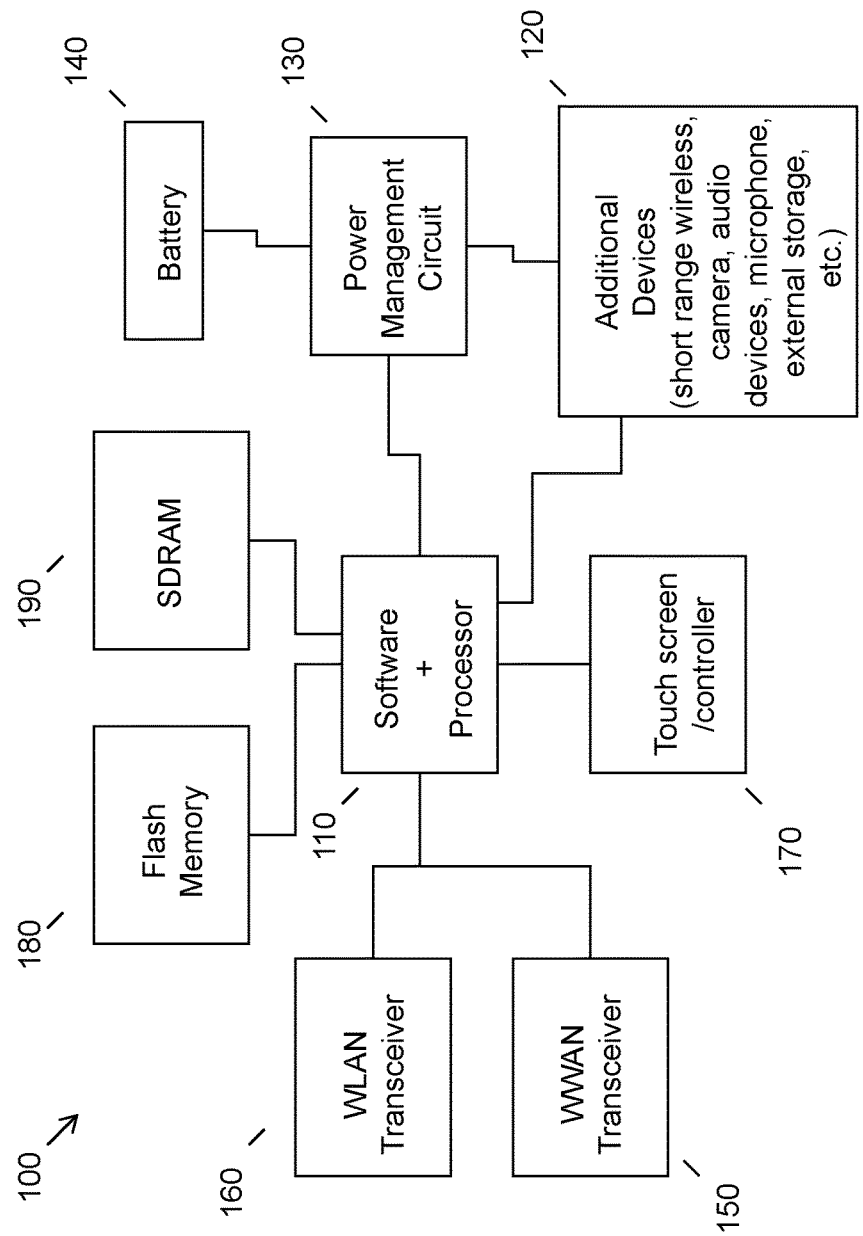
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology advances so does our method of interaction with it. One of the most rapidly evolving fields currently is voice or audio input interaction. For example, a large number of devices are now on the market that allow a user to enter commands verbally. This frees up a user's hands for other actives, such as household chores or using other devices (e.g., typing a document in an office setting). Typically, devices that respond to speech input require some form of activation. One method of activation used in current implementations is speaking an activation cue, trigger phrase, wake-up word, or the like. For example, "OK GOOGLE," "Hey SIRI," "Hey CORTANA," "ALEXA," etc., are example wake up words. GOOGLE is a registered trademark of Google Inc. in the United States of America and other countries. SIRI is a registered trademark of Apple Inc. in the United States of America and other countries. CORTANA is a registered trademark of Microsoft Corporation in the United States of America and other countries. ALEXA is a trademark used by Amazon, Inc., in the United States of America and other countries.

Currently, some third party applications and work arounds may allow a user to create a customized activation cue.

However, is not a widely adopted feature because selecting an activation cue takes a great deal of forethought. Activation cues need to be as phonically unique as possible while not being difficult for a user to say or remember. The uniqueness of the activation cue ensures that a device is not activated on accident (e.g., during normal conversation, by a television, radio, etc.). Thus, it can be extremely difficult for an end-user to create proper conjure syntax (e.g., an activation cue, trigger phrase, etc.) for a digital assistant that is both personal and optimized to avoid conflicts with verbal syntax commonly used in on day to day dialogue.

Thus, most devices or digital assistants require the end-user to utilize specific syntax provided by the manufacturer to conjure action. However, as the number of digital assistants proliferates, and people become more familiar with them, it is expected that users will increasingly want to choose a personalized activation cue to wake up or activate their digital assistant, which will make the experience more familiar and comfortable. As discussed herein, the problem with fully personalized syntax is it may introduce many phonetic conflicts with dialogue used commonly in the respective language or with names of users commonly around a device serving as the medium to a digital assistant.

The technical issue presents problems for a user when utilizing a personal digital assistant or voice based device. Improving the comfort and usability of a voice controlled device is integral to wider adoption and use by end-users. Thus, a much more convenient scenario would be where a user could customize their activation cue while also ensuring that the customization would function as anticipated (e.g., few to no false positives).

Accordingly, an embodiment provides a method of assisting end-users in creating conjure syntax (e.g., activation cue, trigger phrase, wake-up word, etc.) that is both personal and minimally conflicted with common phonetics that occur around the device or in general language. One embodiment may operate in a manner with parallels to password coaching systems in use today. For example when a user is typing a new password for an account, the password strength may be reported in real-time (e.g., "strong", "weak", red or green coloring, etc.) to the user as they enter a personally chosen password. Similarly, in one embodiment, as disclosed herein, a process will be used that guides a user toward a phonetically unique custom choice for the activation cue associated to a digital assistant.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio capture device such as a microphone. System 100 often includes a touch screen 170 for data input and display/rendering. System 100 also typically includes various memory devices, for example flash memory 180 and SDRAM 190.

Figure 2:
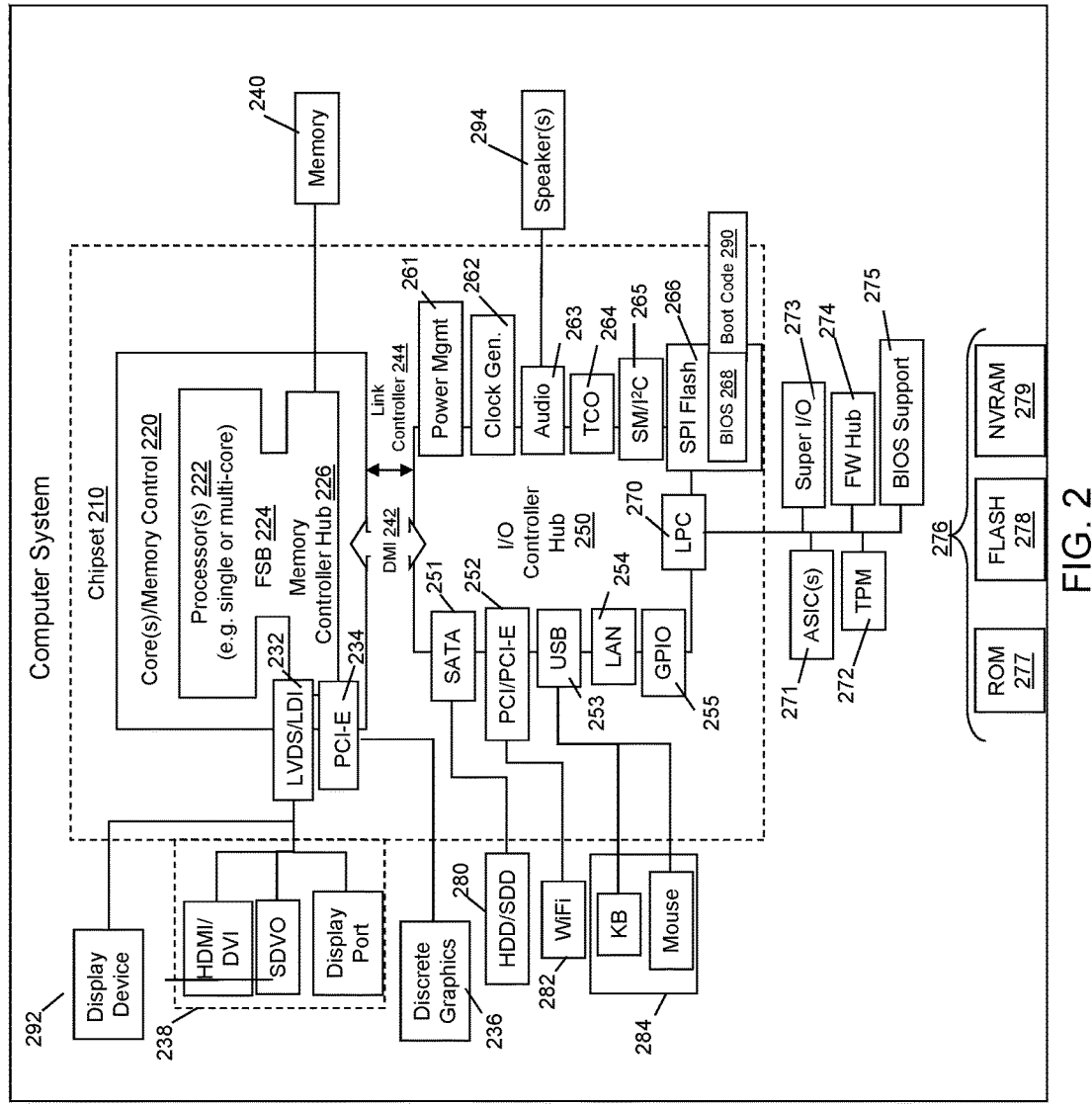
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may utilized as a medium for interacting with a personal digital assistant. For example, the circuitry outlined in FIG. 1 may be implemented in a tablet or smart phone embodiment, whereas the circuitry outlined in FIG. 2 may be implemented in a personal computer embodiment.

Figure 3:
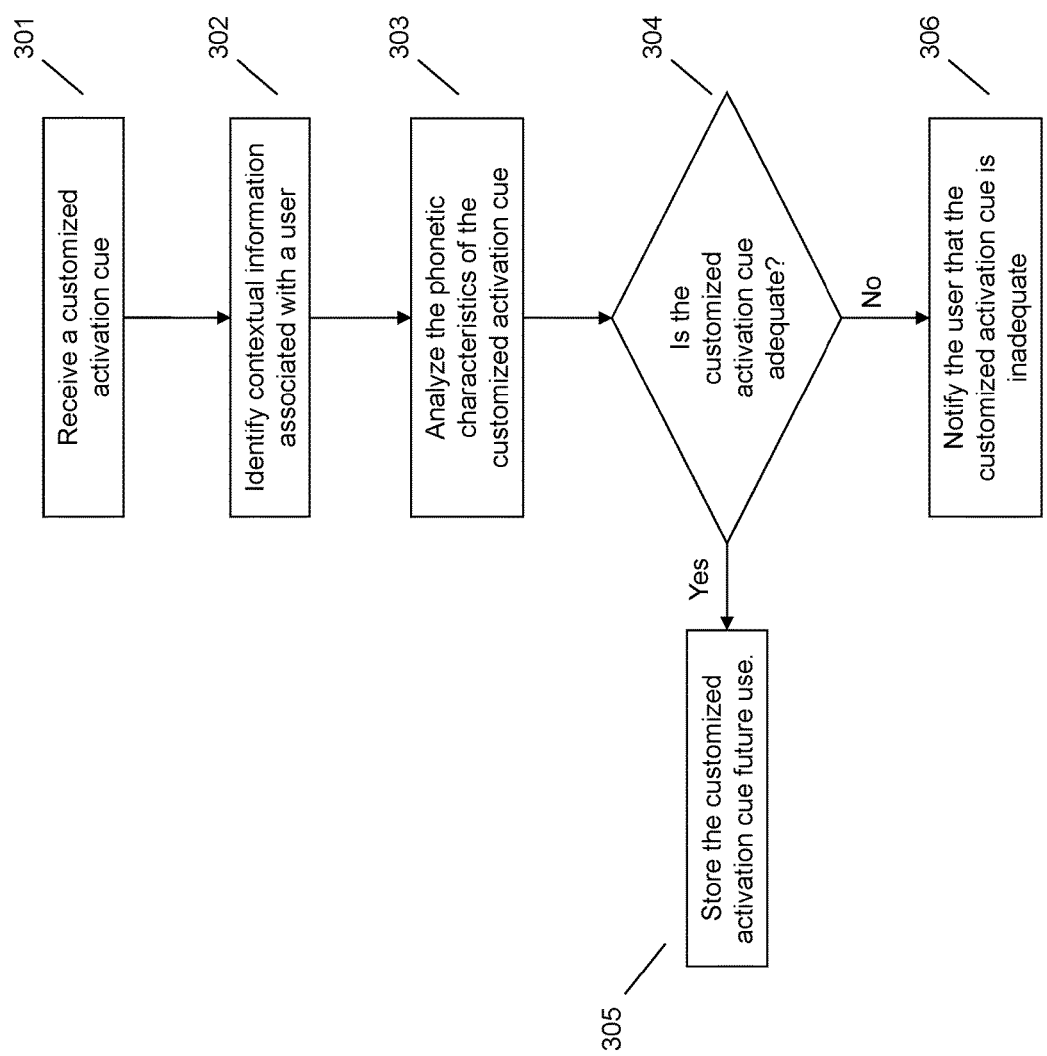
FIG. 3 illustrates an example method of increasing activation cue uniqueness.

Referring now to FIG. 3, an embodiment may receive a custom activation cue at 301. The custom activation cue may be received using any audio capture device, such as a single microphone or microphone array. In one embodiment, the audio received may be voice data (e.g., speech) of a user. For example, a user may desire to modify the default activation cue in a device that has the ability to utilize a custom activation cue. Thus, for example, the user may press a button (or series of buttons) or enter a command using some form of input causing the device to prompt the user to enter their desired custom activation cue.

In an additional embodiment, contextual information associated with a user is identified at 302. This contextual information may be any type of information relevant to a user or group of users and may be collected via a variety of ways. By way of non-limiting example, an embodiment may monitor general user voice input (e.g., conversations that take place proximate to the audio capture device) or prompt a user to enter additional voice input (e.g., family member names, pet names, etc.). Additionally, an embodiment may monitor or receive additional user information from other forms of user communication (e.g., electronic mail, text messages, etc.) or device interaction (e.g., monitoring visited websites, television programs watched, and the like.

Once the customized activation cue is received at 301 and the contextual information is identified, an embodiment may analyze the phonetic characteristics of the custom activation cue using for example the contextual information at 303. By way of non-limiting example, an embodiment may identify the number of syllables that make up the received voice input (e.g., customized activation cue). One or more other embodiments may analyze the voice input using various other characteristics (e.g., intonations, inflection, tone, pitch, accent, etc.). Based on this analysis, an embodiment may determine the phonetic uniqueness of the custom activation cue as compared to the most common words in the respective language (e.g., English), as compared to stock wake up words, etc. The phonetic uniqueness is important to the selection of a custom activation cue because the more unique the phrase or word, the less likely a system is to have a false positive or an incorrect assumption, as discussed herein.

Therefore, in one embodiment, a determination is made regarding the uniqueness of the custom activation cue at 304. If an embodiment determines that the phrase or activation cue is phonetically unique, and thus not at a high risk of failure or generating false positives, it may store the customized activation cue for future use at 304. Alternatively, based on the metrics and analysis discussed herein, an embodiment may determine that the custom activation cue is inadequate at 304.

The ability and/or method of an embodiment to determine uniqueness can vary based on multiple factors. For example, in one embodiment, a comprehensive lexicon of the selected language may be used to compare against the desired custom activation cue. In a further embodiment, additional information may be used to analyze the custom activation cue. As a non-limiting example, a user may enter audio data (e.g., speak), perhaps at the device's request, words and phrases that are regularly used in proximity to the device. These words may be, for example, the names of family members or common terms used in a specific business or work setting (e.g., prosecution, patent, reference, etc.). An embodiment may, once these specific words and/or phrases are captured by the device, analyze them for phonetic characteristics in a similar manner to that discussed herein with regard to the custom activation cue (e.g., 303).

Based on the analysis of the words and phrases regularly used around the device, an embodiment adjusts the mechanism for determining uniqueness of the customized activation cue. For example, if a user had wished to use the activation cue "Hey Robot" an embodiment may normally determine the phrase to have a high phonetic uniqueness. However, if the user also had a family member named Robert, an embodiment may determine that Robert is too phonetically similar to "Hey Robot," and thus reduce the uniqueness score.

Another complication factor is that a device or personal digital assistant may be used by multiple people. Thus, an embodiment may compare the custom activation cue to terms or phases regularly used by other users. For example, custom activation cues used by other individuals, or phrases/sayings other individuals use on a regular basis. In a further embodiment, the audio capture device may be on at all times, but only perform an action when the activation cue or trigger phrase is spoken. Thus, because the device is an always on system, it can capture and record any audio (e.g., speech) within proximity of the device.

Based on this large quantity of captured audio, an embodiment may analyze all proximate speech and build a repository of the most used terms and their phonetic characteristics. For example, an embodiment may listen to interpersonal dialogue that occurs around the device and weigh the analyzing of phonetic uniqueness against the phonetics most common in this very personal local context, instead of or in addition to the incidence of the phonetics generally in the respective language.

In a further embodiment, once the uniqueness of the custom activation cue is determined, it is compared against a predetermined threshold to determine if it is adequate. In one embodiment, the predetermined threshold may be user selected, user determined, or user variable. Additionally or alternatively, the threshold may be based on a specific device or specific application requirements. For example, if the device had access to personal or confidential information, the level of uniqueness may need to be much higher than the custom activation cue on a general purpose device.

Once an embodiment determines the customized activation cue is inadequate at 306, it may notify the user regarding that inadequacy at 306. The notification may be in any form transmittable via a device. For example, visual (e.g., on a display screen), audible (e.g., a tone or phrase), tactile (e.g., vibration), etc. In addition to notifying the user of inadequacy, a further embodiment may also present the user with a uniqueness score. The uniqueness score may help a user determine how far away they are from an adequate term or phase.

In another embodiment, the notification may also propose one or more alternate activation cues. For example, if a user enters an activation cue with very low uniqueness, an embodiment may slightly alter or add additional syllables to the user entered phrase and offer it as an alternative for user selection. If a user determines that one of the alternate activation cues is acceptable, an embodiment may store the alternative activation cue for future use at 305.

Accordingly, as illustrated by the example embodiments and figures, an embodiment provides a method of receiving a customized activation cue. The customized activation cue is then analyzed to identify its phonetic characteristics. Based on the identified phonetic characteristics, an embodiment can determine if the customized activation cue is adequate. If the custom activation cue is inadequate, a further embodiment may notify the user, and/or offer suggested alternatives for the customized activation cue.

The various embodiments described herein thus represent a technical improvement to the user of voice activated systems. This technical improvement enhances the usability of a voice controlled device while also adding a layer of security not previously present.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an audio capture device, a customized activation cue from a user to activate an application on a device, wherein the customized activation cue above a uniqueness threshold allows the user to access the application on the device;

receiving a lexicon of the user, wherein the lexicon is generated from at least one conversation of the user occurring proximate to the audio capture device and interpersonal dialog that occurs around the device to build a personal local context;

identifying a uniqueness of the customized activation cue by determining a commonality of the customized activation cue with respect to the lexicon of the user and the personal local context, the lexicon comprising a repository of terms received from the user and phonetic characteristics of the terms and wherein the commonality is determined by comparing the phonetics of the customized activation cue to the lexicon;

determining the uniqueness threshold corresponding to the application and the device; and responsive to said identifying and determining, notifying the user that the customized activation cue has inadequate uniqueness based on the uniqueness threshold of the application and providing an alternative activation cue based upon the received customized activation cue and the lexicon.

2. The method of claim 1, wherein the customized activation cue comprises voice input.

3. The method of claim 2, wherein said identifying comprises, identifying a number of syllables of the voice input.

4. The method of claim 2, wherein said identifying comprises identifying intonation of the voice input.

5. The method of claim 1, wherein said identifying comprises, identifying a phonetic uniqueness.

6. The method of claim 1, wherein said notification further comprises at least one alternate customized activation cue suggestion.

7. The method of claim 1, wherein said notification further comprises, a determined level of uniqueness of the customized activation cue.

8. The method of claim 1, wherein said identifying further comprises identifying that the uniqueness is below a predetermined threshold.

9. The method of claim 1, wherein the lexicon comprises one or more terms frequently spoken by at least one user.

10. The method of claim 1, wherein the lexicon comprises information selected from the group consisting of: voice input, electronic mail, textual messages, and known user interests.

11. An information handling device, comprising:
an audio capture device;
a processor;
a memory device that stores instructions executable by the processor to:
receive, at the audio capture device, a customized activation cue from a user to activate an application on a device, wherein the customized activation cue above a uniqueness threshold allows the user to access the application on the device;
receive a lexicon of the user, wherein the lexicon is generated from at least one conversation of the user occurring proximate to the audio capture device and interpersonal dialog that occurs around the device to build a personal local context;
identify a uniqueness of the customized activation cue by determining a commonality of the customized activation cue with respect to the lexicon of the user and the personal local context, the lexicon comprising a repository of terms received from the user and phonetic characteristics of the terms and wherein the commonality is determined by comparing the phonetics of the customized activation cue to the lexicon;
determine the uniqueness threshold corresponding to the application and the device; and
responsive to said identification and determination, notify the user that the customized activation cue has inadequate uniqueness based on the uniqueness threshold of the application and providing an alternative activation cue based upon the received customized activation cue and the lexicon.

12. The information handling device of claim 11, wherein the customized activation cue comprises voice input.

13. The information handling device of claim 12, wherein said identifying comprises, an identification of at least one of: a number of syllables of the voice input and an intonation of the voice input.

14. The information handling device of claim 12, wherein said identifying comprises, an identification of a phonetic uniqueness.

15. The information handling device of claim 11, wherein said notification further comprises at least one alternate customized activation cue suggestion.

16. The information handling device of claim 11, wherein said notification further comprises, a determined level of uniqueness of the customized activation cue.

17. The information handling device of claim 11, wherein said identification further comprises, an identification that the uniqueness is below a predetermined threshold.

18. The information handling device of claim 11, wherein the lexicon comprises one or more terms frequently spoken by at least one user.

19. The information handling device of claim 11, wherein the lexicon comprises information selected from the group consisting of: voice input, electronic mail, textual messages, and known user interests.

20. A product, comprising:
a storage device having code stored therewith, the code being executable by a processor and comprising:
code that receives, at an audio capture device, a customized activation cue from a user to activate an application on a device, wherein the customized activation cue above a uniqueness threshold allows the user to access the application on the device;
code that receives a lexicon of the user, wherein the lexicon is generated from at least one conversation of the user occurring proximate to the audio capture device and interpersonal dialog that occurs around the device to build a personal local context;
code that identifies a uniqueness of the customized activation cue by determining a commonality of the customized activation cue with respect to the lexicon of the user and the personal local context, the lexicon comprising a repository of terms received from the user and phonetic characteristics of the terms and wherein the commonality is determined by comparing the phonetics of the customized activation cue to the lexicon;
code that determines the uniqueness threshold corresponding to the application and the device; and
code that responsive to said identification and determination, notifies the user that the customized activation cue has inadequate uniqueness based on the uniqueness threshold of the application and providing an alternative activation cue based upon the received customized activation cue and the lexicon.

* * * * *